Sept. 18, 1945.  J. P. SCHELLHAUS, JR  2,385,302
MACHINE FOR MAKING STEMWARE
Filed March 28, 1942   7 Sheets-Sheet 1

J. P. Schellhaus Jr.
INVENTOR

BY Rule & Hoge,
ATTORNEYS

Sept. 18, 1945.  J. P. SCHELLHAUS, JR  2,385,302
MACHINE FOR MAKING STEMWARE
Filed March 28, 1942  7 Sheets-Sheet 7

J. P. Schellhaus Jr.
INVENTOR

BY Rule and Hoge,
ATTORNEYS

Patented Sept. 18, 1945

2,385,302

UNITED STATES PATENT OFFICE 2,385,302

MACHINE FOR MAKING STEMWARE

John P. Schellhaus, Jr., Toledo, Ohio, assignor, by mesne assignments, to Owens-Illinois Glass Company, Toledo, Ohio, a corporation of Ohio Application March 28, 1942, Serial No. 436,656

22 Claims. (Cl. 49—1)

My invention relates to machines for use in the manufacture of glass articles, such as stemware, including goblets, wine glasses, and other articles comprising a bowl and an attached stem. The invention as herein illustrated is adapted for use in making stemware of the class in which the stems are molded in a press mold and thereafter attached to the bowl which has been blown as a separate piece. Ware of this class has usually been made entirely by hand operations.

An object of the present invention is to provide a machine in which various operations which are ordinarily performed by hand are done automatically, thereby greatly reducing the hand labor required and producing articles which are comparatively uniform in size and shape.

A further object of the invention is to provide a machine adapted to receive blow pipes with the blown bowls thereon, the machine including press molds, means for press molding gobs of glass therein to form the stems, means for welding the molded stems to the bowls, and means for reheating the lower end of each stem preparatory to having a foot welded thereto. Other objects of the invention will appear hereinafter.

Referring to the accompanying drawings:

Fig. 16 shows a blow pipe with a blown bowl thereon.

Fig. 17 shows the bowl straightening operation.

Fig. 18 shows the mold and press plunger at the completion of the pressing operation.

Fig. 19 shows the mold lifted and the shear at the completion of the severing operation.

Fig. 20 shows a cooling operation.

Fig. 21 shows the lower end of the stem being reheated preparatory to having a foot attached thereto.

Figure 1:
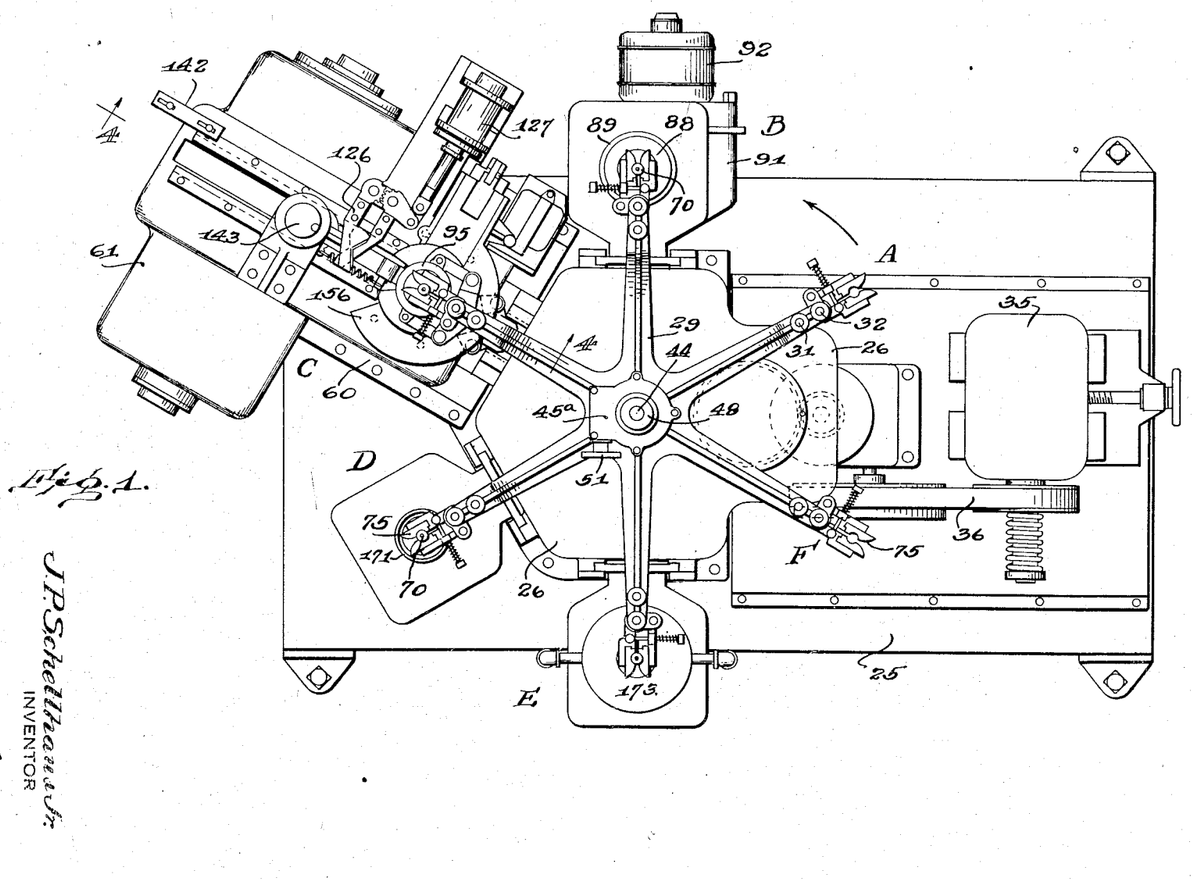
Fig. 1 is a plan view of a machine embodying the present invention.
Figure 2:
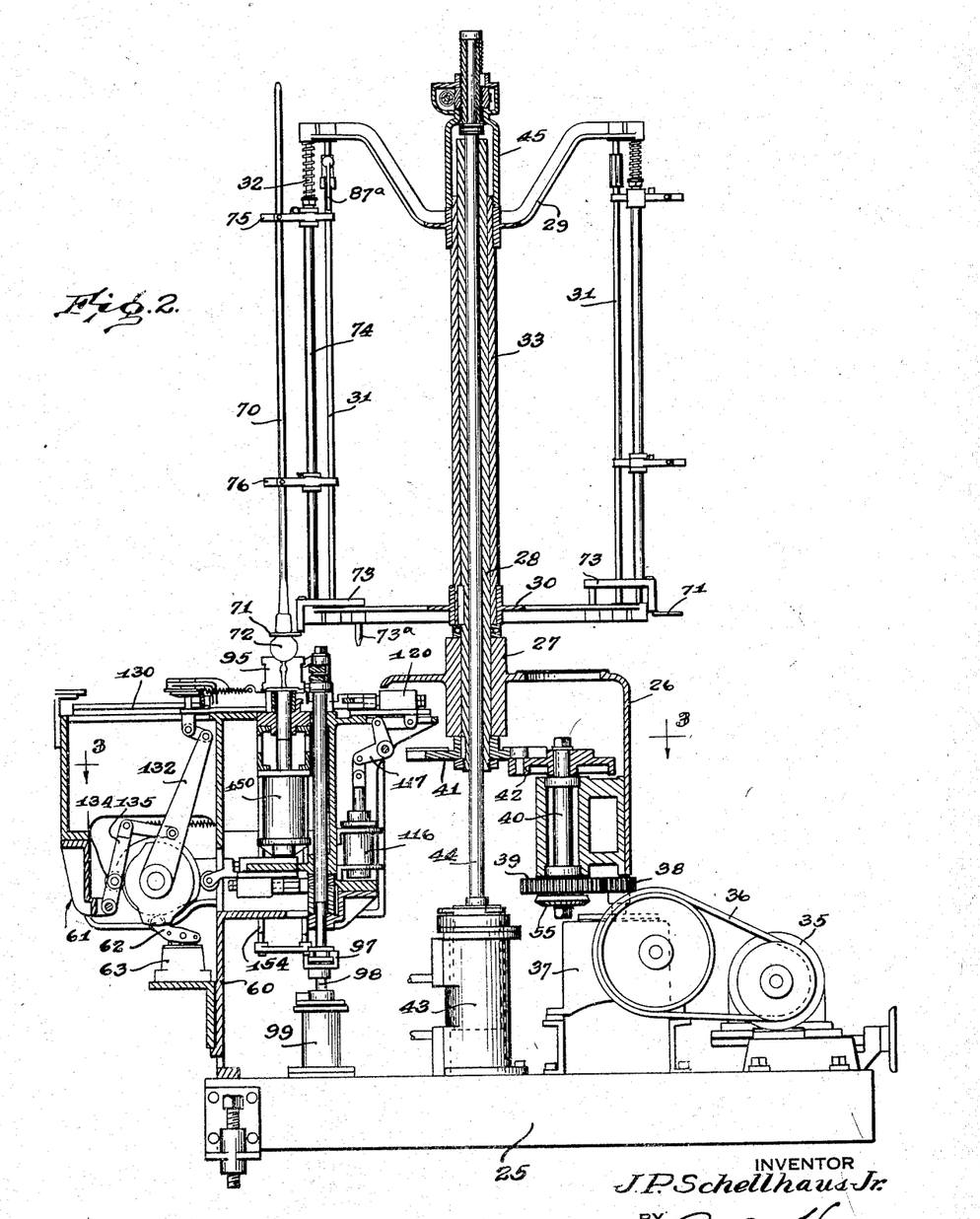
Fig. 2 is a sectional elevation of the machine.
Figure 3:
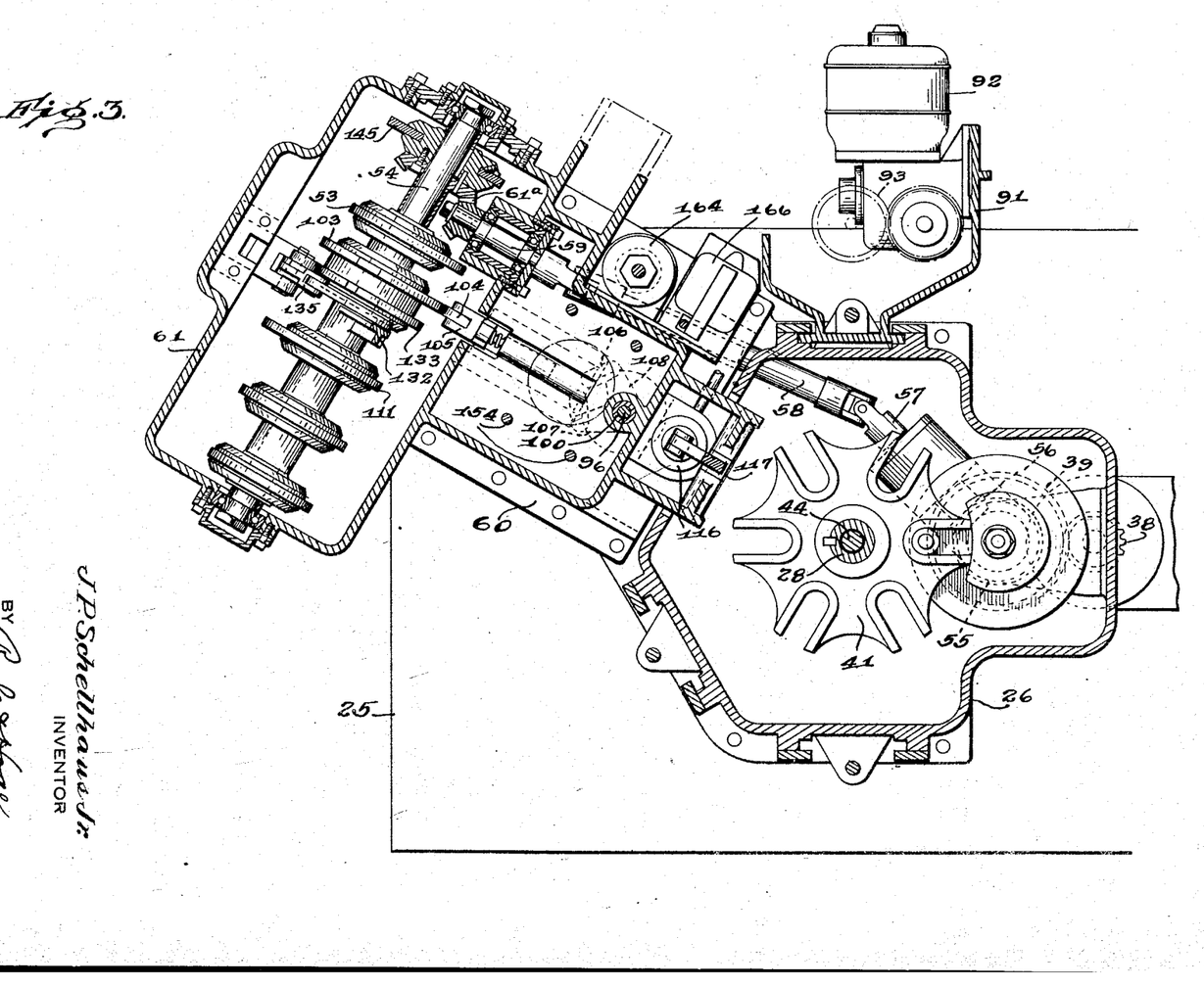
Fig. 3 is a sectional plan at the line 3—3 on Fig. 2.

Referring particularly to Figs. 1, 2 and 3 the machine comprises a base 25 on which is supported a casting 26 formed with a bearing sleeve 27 in which is journalled a tubular shaft 28. A carriage mounted on the shaft comprises an upper spider 29 and a lower spider 30 connected by vertical tie rods 31 and 32. The hubs of the spiders are attached to a tubular shaft or casing 33 keyed to the shaft 28.

As shown, each of the spiders comprises 6 radial arms, the arms and tie rods being equipped with blow pipe holding mechanisms, thereby providing 6 blow pipe holder units symmetrically arranged in an annular series surrounding the axis of the carriage. The carriage is intermittently rotated step by step for bringing each unit in succession to stations designated A, B, C, D, E and F. The carriage is also intermittently lifted and lowered.

The means for indexing the carriage comprises a motor 35 having driving connections 36 with speed reduction gearing contained in a gear box 37, said gearing being connected to drive a pinion 38 and a gear wheel 39 on the lower end of a shaft 40. Driving connections between the shaft 40 and the carriage include a Geneva gear wheel 41 keyed to the shaft 28 and driven by a Geneva driving element 42 keyed to the shaft 40. The carriage is lifted and lowered by means of an air operated piston motor 43 having a piston rod 44 which extends upwardly thru the tubular shaft 28 and has a connection at its upper end with the carriage (see Figs. 2 and 9). This connection includes a casting 45 threaded onto the upper end of the shaft 33. The casting is formed with a neck portion 46 of reduced diameter providing a bearing for a tubular shaft 47 which is rotatably mounted on the piston rod 44. The cap 45ª of the casting 45 is splined on the shaft 47 to permit up and down adjustment of the carriage. The upper end of the shaft 47 abuts a collar 48 keyed to the rod 44. Means for adjusting the carriage up and down relative to the rod 44 comprises a worm gear wheel 49 threaded on the shaft 47 and a worm 50 on a worm shaft mounted in the casting 45 and which may be rotated by a hand wheel 51. Ball bearings 52 interposed between the tubular shaft 47 and the plunger rod 44, support the weight of the carriage.

Figures 12, 14:
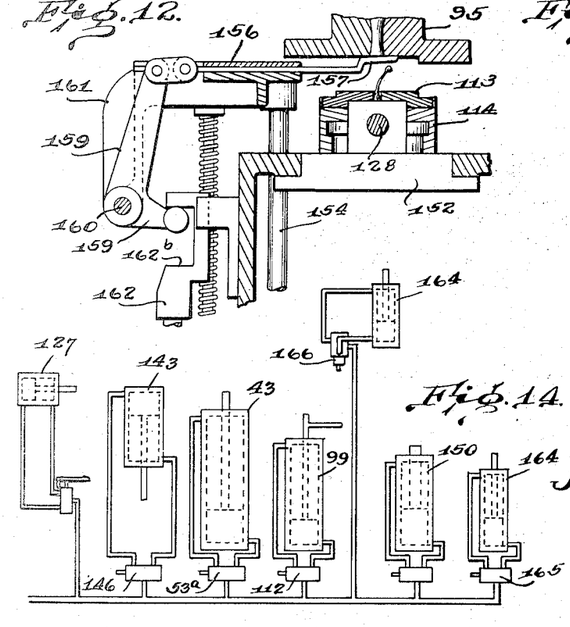
Fig. 12 is a sectional view of parts shown in Fig. 10 but with the cutter in its forward position.
Fig. 14 is a diagrammatic view of the air motors.

The air motor operates in synchronism with the Geneva drive so that the carriage is first lifted then indexed thru 60° and then lowered. The carriage lifting motor 43 is under the control of a cam 53 (Fig. 3) mounted on a cam shaft 54. The shaft 54 is driven from the shaft 40 thru a gear train comprising a bevel gear 55 on the lower end of the shaft 40 and driving a gear 56 on a shaft 57 which has a universal joint connection with one end of a rod 58, the other end of which is connected by a universal joint with a shaft 59 journalled in a casting 60 mounted on the machine base. The casting 60 and a casting 61 surmounting it, together provide a housing and support for the cam shaft and other mechanism at station C. The shaft 59 has driving connection thru gears 61ª with the shaft 54. The cam 53 operates thru a lever 62 (Fig. 4) to actuate a valve 53ª (Fig. 14) which controls the carriage lifting motor 43.

Figures 4, 5:
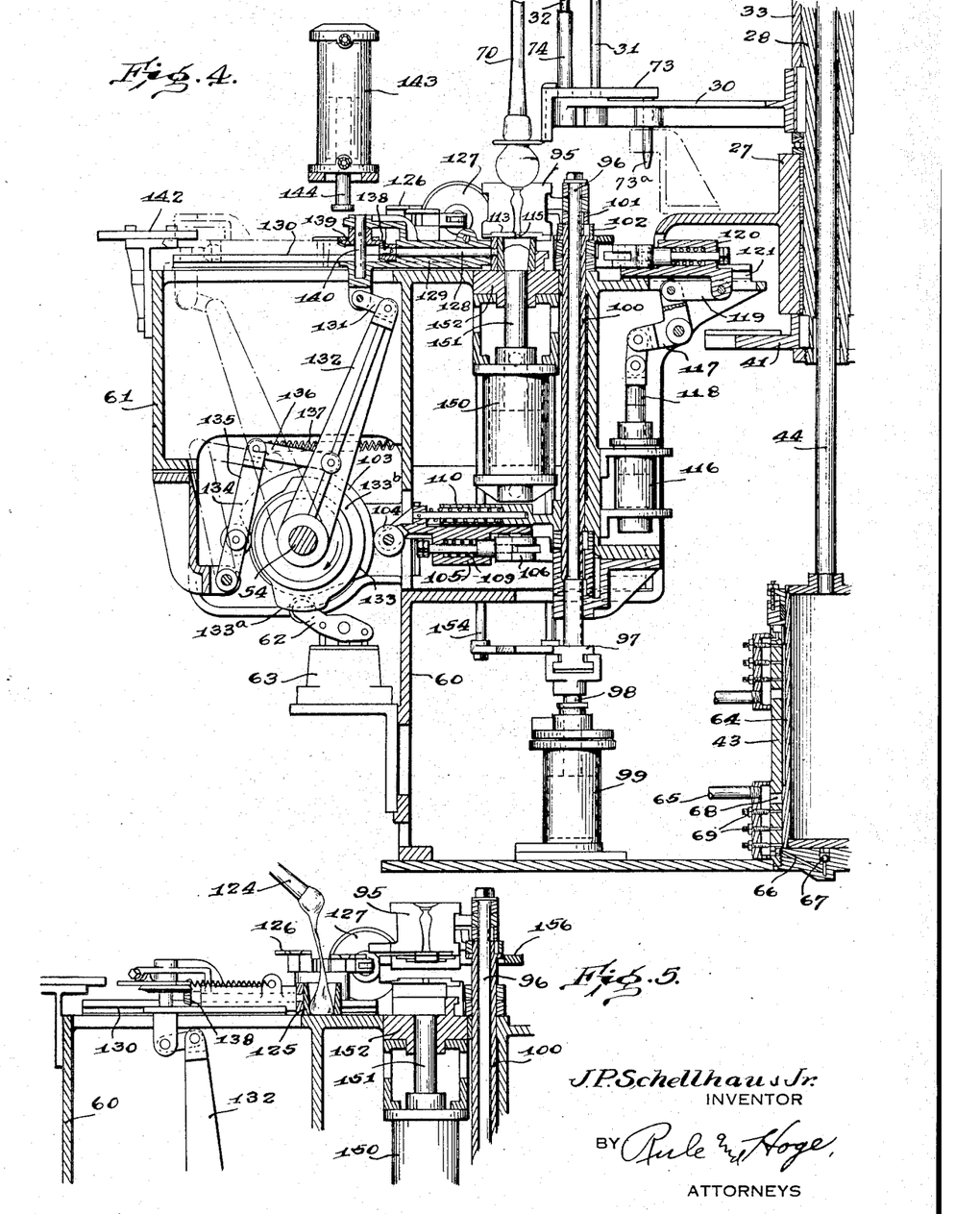
Fig. 4 is a sectional elevation at the line 4—4 on Fig. 1.
Fig. 5 is a sectional view of a portion of the mechanism shown in Fig. 4, but with the press plunger withdrawn and the gob transfer cup in receiving position.

As shown in Fig. 4 the motor 43 includes a cylindrical piston 64 attached to the rod 44 and movable up and down in the stationary cylinder. Air under pressure for lifting the piston is supplied thru a pipe 65, passageway 66 and past a check valve 67 beneath the piston. When the piston is lowered the air is exhausted thru a port 68 and the pipe 65 until the piston nears its lower limit and is then cushioned by cutting off the port 68. The throttle valves 69 then control the exhaust during the final downward movement.

Figures 6, 7, 8, 9:
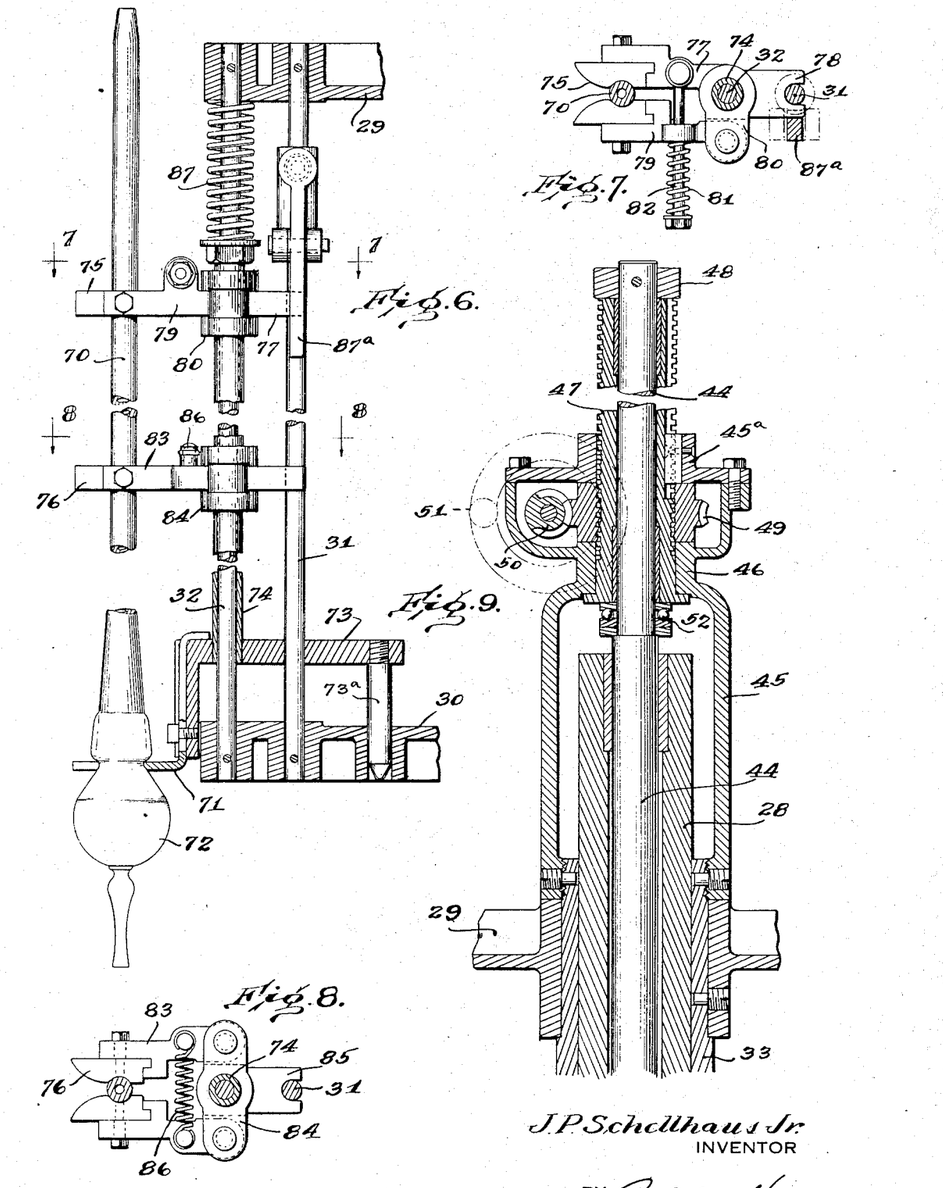
Fig. 6 is a part sectional elevation of means for holding a blow pipe.
Figs. 7 and 8 are sections at the lines 7—7 and 8—8 respectively, on Fig. 6, showing the blow pipe gripping devices.
Fig. 9 is a sectional elevation of the upper portion of the blow pipe carriage and adjusting mechanism therefor.

In making goblets or other articles with the present machine, bulbs are first blown on the blow pipes 70 to form the bowls, this being a hand operation. The blow pipes with the attached bulbs or work-pieces are then snapped into position on the carriage. Each unit on the carriage comprises means for supporting a blow pipe. Such means includes a forked arm 71 (Figs. 2 and 6) to engage the neck of the bowl 72, said arm being attached to a plate or bracket 73 movable up and down on the tie rods 31 and 32. A guide pin 73ª aids in guiding the plate 73 and holding it level. The plate 73 is attached to the lower end of a sleeve or tubular shaft 74 which is slidable up and down on the rod 32. Upper and lower pairs of gripping jaws or snaps 75 and 76 are mounted on the shaft 74. As shown in Figs. 6 and 7 one of the upper jaws is carried on an arm 77 mounted on the shaft 74, said arm having a recessed end 78 slidable on the rod 31. The other jaw is carried on an arm 79 pivoted between a pair of lugs 80 on the arm 77. A spring 81 on a rod 82 serves to clamp the jaws to the blow pipe. The lower clamping jaws 76 (Figs. 6 and 8) are carried on a pair of arms 83 pivoted to a yoke 84 mounted on the shaft 74. Said yoke has an extension 85 bifurcated to straddle the rod 31. A coil tension spring 86 holds the jaws in clamping engagement with the blow pipe. The shaft 74 is slidable up and down on the rod 32 and is held in its lowered position by a coil spring 87 mounted on the rod 32 and held under compression between the upper spider 29 of the carriage and the upper end of the shaft. This construction permits a limited upward movement of the blow pipe and bowl during the molding operation as hereinafter described. When a blow pipe is not in use it may be lifted to the Fig. 6 position and held by a latch 87ª mounted on the rod 31.

Figure 13:
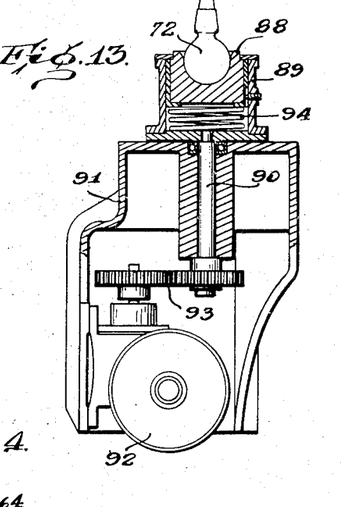
Fig. 13 is a sectional elevation of the bowl straightening mechanism.

The cycle of operations will be described in connection with the fabrication of a single article, it being understood that a number of articles corresponding to the number of units on the carriage are being fabricated concurrently. Following each indexing movement of the carriage, a blow pipe 70 with a blown bowl 72 thereon is snapped into place on the carriage at the station A. The carriage is then lifted, indexed thru 60° to bring the blow pipe and bowl over the straightening device at station B, and lowered preliminary to the straightening operation. The straightening means (Figs. 1 and 13) includes a cup-shaped block 88 to receive the bowl 72 as the carriage is lowered. The block is mounted in a holder 89 secured to the upper end of a shaft 90 journalled in a gear box 91. The shaft 90 is rotated by an electric motor 92 which runs continuously and is connected thru a gear train 93 to said shaft. A coil spring 94 mounted in the holder 89 beneath the shaping block 88 permits said block to yield downwardly under pressure. When the carriage is lowered with a blow pipe at station B the bowl 72 is centered and straightened with respect to the blow pipe. After this straightening operation the carriage is again indexed bringing the blow pipe and bowl to the press station C. Mechanism is provided at this station for forming a stem in a press mold and attaching it to the bowl.

The press mold 95 in which the stems are molded by a pressing operation, comprises partible mold sections which swing about the axis of a vertical rod 96. Attached to the lower end of the rod 96 is a connector 97 by which the rod is connected to the piston rod 98 of an air operated piston motor 99. The rod 96 extends thru a tubular shaft 100 which is mounted thereon for oscillating movement. The mold sections are carried on arms 101 and 102 which are connected respectively to the rod 96 and the tubular shaft 100. The opening and closing movements of the press mold 95 are under the control of a cam 103 (Figs. 3 and 4) on the cam shaft 54. A cam follower roll 104 running on the cam is carried on a slide block 105 which is mounted for sliding movement toward and from the rod 96. The slide block is connected thru links 106 with arms 107 and 108 which are connected respectively to the rod 96 and shaft 100. A compression spring 109 provides a yielding connection between the slide 105 and the links 106. A compression spring 110 holds the cam follower roll 104 against its cam. The motor 99 for lifting the mold, is under the control of a cam 111 secured to the cam shaft 54. The cam 111 operates the motor valve 112 (Fig. 14) of the motor 99. Said valve may be housed in the valve casing 63 and operated thru a lever corresponding to the lever 62 (Fig. 4).

Figure 15:
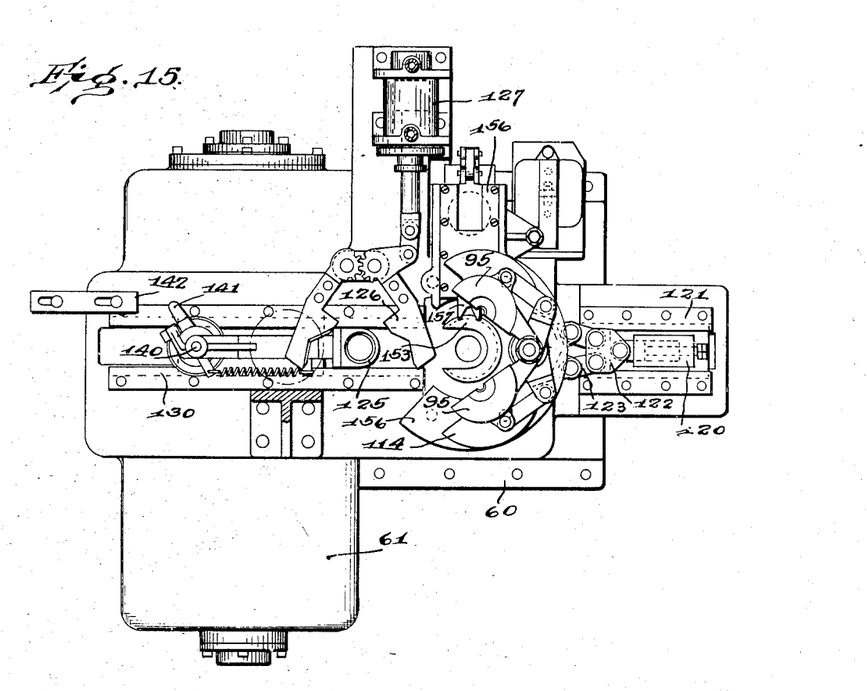
Fig. 15 is a plan view of the molding and shearing mechanism shown in Fig. 1 but on a larger scale and with the parts in a different relative position.

Directly beneath the mold is a press plate 113 comprising partible sections carried on a pair of arms 114 mounted to swing on the tubular shaft 100. The meeting edges of the plate sections are shaped to provide a restricted opening 115 which is in alignment with the mold cavity and provides a passageway thru which the glass enters the mold. The arms 114 with the sections of the pressure plate 113 thereon are moved toward and from each other by an air operated piston motor 116 (Fig. 4). Operating connections between the motor and said arms and plate sections include a bell crank lever 117, one arm of which is connected thru a link to the motor piston rod 118 and the other arm of which is connected thru a link 119 to a slide block 120 which is mounted to slide in guideways 121 (Figs. 4 and 15). The slide block has pivoted thereto a connector plate 122 which is connected thru links 123 to the arms 114.

The gobs of glass for forming the stems are hand gathered by a punty rod 124 (Fig. 5) and dropped into a transfer cup 125 in which the gobs are transferred to a position beneath the mold. When a gob is dropped into the cup the trailing glass is severed by a pair of shears 126 (Fig. 15) actuated by an air motor 127, manually controlled as by means of a foot pedal. The cup is attached to one end of a shaft 128 (Fig. 4) which extends lengthwise thru a slidable carrier 129 mounted to reciprocate in guideways 130 on the machine frame. The carrier 129 is connected thru a link 131 to a rock arm 132 mounted to rock on the cam shaft 54. The movements of the rock arm 132 are under the control of a cam 133 operating thru connections including a cam follower roll 134 running on the cam. Said roll is mounted on a rock arm 135 pivoted at one end on the machine frame and having its other end connected thru a link 136 to the arm 132. A spring 137 holds the roll 134 on the cam.

As the cam 133 rotates clockwise from the Fig. 4 position in which the transfer cup is beneath the mold, a high portion 133ª of the cam is brought to the cam roll and the arm 132 is swung to the left thereby moving the carrier 129 outwardly to the broken line position in Fig. 4. As the transfer cup approaches this outward position the shaft 128 is rotated to invert the cup and permit the residual glass which remains in the cup after the pressing operation, to be ejected. The means for thus inverting the cup includes miter gears 138 and 139 connected respectively to the shaft 128 and a vertical shaft 140, the latter being mounted for oscillating movement on the carrier 129. A rock arm 141 (Fig. 15) on the shaft 140, projects into position to be engaged by a stop bar 142 having a stationary mounting. The stop is so adjusted that as the arm 132 reaches the limit of its outward movement the arm 141 has been rocked and thru the miter gearing has inverted the transfer cup.

Figures 16, 17, 18, 19, 20, 21, 22:
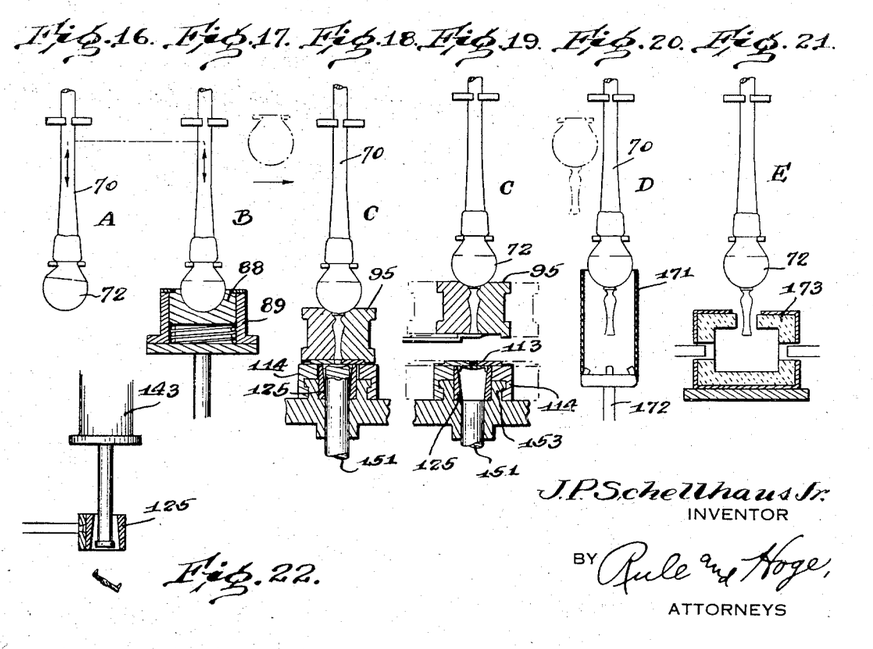
Figs. 16 to 21 are diagrammatic views showing successive steps in the operation of the machine.
Fig. 22 is a detail view showing means for ejecting the residual glass from the gob transfer cup.

A knock-out device now operates to forcibly eject the residual fragment of glass which may remain in the cup. Such knock-out device comprises a piston motor 143 (Figs. 4 and 22), the piston rod 144 of which is moved downward into or thru the inverted cup. The knock-out motor 143 is under the control of a cam 145 (Fig. 3) which operates the valve 146 (Fig. 14) for the motor. The operating connection between the knock-out cam and the valve may be substantially the same as that described in connection with preceding valves. After the knock-out operation the high section 133ª of the cam runs off the roll 134 and the arm 132 is returned to the intermediate position (Fig. 5) for receiving the charge of glass and is held in such position by an intermediate portion 133ᵇ of the cam.

Figure 10:
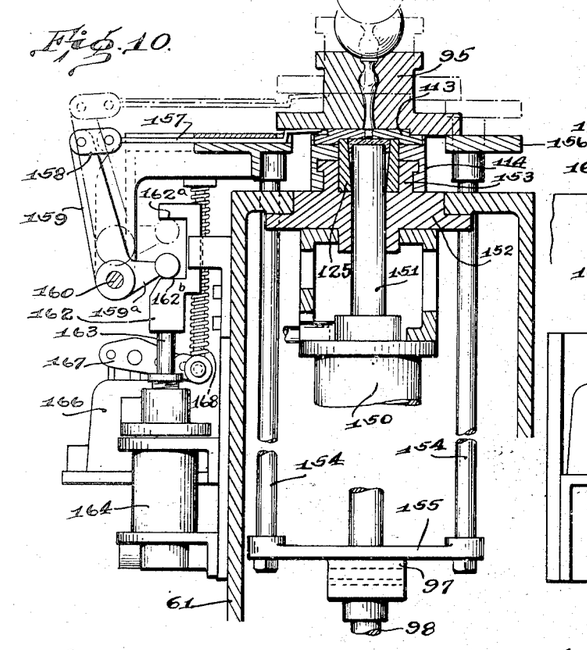
Fig. 10 is a sectional elevation showing particularly the press plunger, mold and shearing mechanism.

When the transfer cup with its charge of glass has been moved into position beneath the mold (Fig. 4) and the mold sections have been brought together with the press plate 113 in position thereabeneath, the press plunger is operated by a piston motor 150. The plunger 151 attached to the motor piston moves up and down thru a bottom plate 152 on which the cup 125 is supported, the plunger being flush with the surface of said plate when the cup is moved into position thereon. As the plunger moves upward the glass is forced thru the opening 115 in the press plate 113 into the mold cavity, thereby filling said cavity (Fig. 10). The plate 152 has formed integral therewith a wall 153, substantially U-shaped in plan, to receive and center the transfer cup. Said wall also serves to center the arms 114 and press plate 113.

When the glass is forced into the mold 95 by the press plunger for forming the stem, the latter is pressed against the bowl which is seated on the mold, thereby welding the stem to the bowl. After the pressing operation the mold 95 is lifted a short distance above the transfer cup to permit a shearing operation. Connections between the mold lifting motor 99 and the mold include vertical rods 154 (Fig. 10) connected at their lower ends to a cross bar 155 formed on the connector 97. A plate 156 carried on the rods 154 provides a support for the mold sections, said plate being arc-shaped as shown in Fig. 15.

Figure 11:
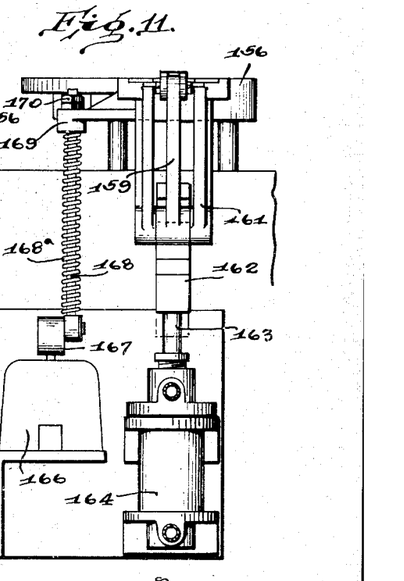
Fig. 11 is an elevation view looking in a direction from the left of Fig. 10, showing particularly the shear operating mechanism.

The means for severing the glass in the mold (Figs. 10 to 12 and 15) comprises a knife blade or cutter 157 mounted for sliding movement in the plate 156. The blade is connected thru a link 158 to one arm of a bell crank 159 which is pivoted at 160 between bracket arms 161 depending from the plate 156. The other arm 159ª of the bell crank projects into an elongated recess formed in a head 162 attached to a piston rod 163 of a motor 164, said recess providing upper and lower contact surfaces 162ª and 162ᵇ. The motor 164 is under the control of a valve 165 (Fig. 14) which may be mounted in the valve casing 166 (Fig. 10) and actuated by a lever 167. A rod 168 is attached to the lever 167 and extends thru a bearing 169 (Fig. 11) on the plate 156 and has sliding movement therein limited by a stop nut 170. When the plate 156 is moved upwardly for raising the mold the bell crank 159 is moved bodily with it until the arm 159ª engages the upper contact surface 162ª of the head 162. During this movement the bearing 169 is moved upwardly along the rod 168 and contacts the stop nut 170 shortly before such upward movement of the mold is completed. During such upward movement the rod 168 is held in its lowered position by a compression spring 168ª until the stop nut is contacted. The final upward movement of the plate 156 then draws the rod 168 upward and thereby actuates the valve operating lever 167 and opens the motor valve. This causes the motor 164 to lower its piston, thereby rocking the bell crank 159 and moving the shear blade 157 inwardly to the Fig. 12 position, thus severing the glass in the mold from the residual glass in the transfer cup.

After the glass is thus severed, the cup is withdrawn, inverted, the residual glass ejected, the cup reinverted and returned to the gob receiving position (Fig. 5), all in the manner heretofore described. The carriage is now lifted, indexed thru 60° and lowered with the bowl and stem at station D. If desired a cooling or conditioning chamber 171 (Fig. 20) may be located at station D to receive the stem which may be subjected to cooling air supplied thru a pipe 172, or to other temperature conditioning medium.

The next indexing and lowering of the mold carriage introduces the lower end of the stem into a heating chamber 173 or glory hole in which the lower end of the stem is reheated. This reheating may take place at station E or, if making ware which does not require cooling or conditioning within the chamber 171, the latter may be omitted and the reheating chamber may be located at station D. After the end of the stem has been reheated the carriage is raised and indexed, during which time the blow pipe may be removed and passed to an operator who forms a foot at the end of the stem from a hand gathered gob of glass. A blow pipe with an attached bowl and stem is removed from the carriage and another blow pipe with a bowl blown thereon is snapped onto the carriage at each indexing movement.

Modifications may be resorted to within the spirit and scope of my invention.

I claim:

1. A machine for fabricating glass articles comprising a mold carriage, a piston motor for lifting the carriage including a vertically reciprocating piston and piston rod, means for attaching the carriage to said rod, means for intermittently rotating the carriage about the axis of said rod, said carriage comprising a series of units each including means for removably holding a blow pipe, said units being brought in succession to a molding station by the rotation of the carriage, a press mold at said station, said mold having a vertically disposed mold cavity extending therethrough for molding a stem, means for positioning the mold beneath a bowl at the said station, a press plunger spaced below the mold and in line with the mold cavity, means for positioning a charge of glass between the mold and plunger, and means for moving the plunger vertically toward the mold cavity and thereby introducing the glass into the mold cavity, shaping a stem and attaching it to said bowl, said positioning means comprising a transfer cup open at top and bottom, and means for moving said cup from a charge receiving position to a discharging position between the mold and plunger.

2. A machine for fabricating glass articles comprising in combination, a carriage, means for intermittently rotating the carriage step by step about a vertical axis, means for lifting the carriage before each said step rotation and for lowering the carriage at the completion of each step rotation, blow pipe holders on the carriage brought in succession to a molding station by said step rotations of the carriage, a mold at said station, a transfer cup open at top and bottom, means for reciprocating said cup to and from a position beneath and in line with the mold cavity, a press plunger beneath the mold and spaced therebelow, and means for actuating the plunger and thereby forcing glass from the transfer cup into the mold.

3. A machine for fabricating glass articles comprising in combination, a carriage, means for intermittently rotating the carriage step by step about a vertical axis, means for lifting the carriage before each said step rotation and for lowering the carriage at the completion of each step rotation, blow pipe holders on the carriage brought in succession to a molding station by said step rotations of the carriage, a mold having a mold cavity extending vertically therethrough, and shaped to mold a stem, means for positioning the mold beneath a bowl carried by a blow pipe at said station, a press plunger spaced below the mold, a transfer cup, means for reciprocating said cup to and from a position between the plunger and mold cavity, and means for moving the plunger upwardly and thereby transferring a charge of glass from the cup into the mold cavity, molding a stem and welding the stem to the bowl.

4. A machine for fabricating glass articles comprising in combination, a carriage, means for intermittently rotating the carriage step by step about a vertical axis, means for lifting the carriage before each step rotation and for lowering the carriage at the completion of each step rotation, blow pipe holders on the carriage brought in succession to a molding station by said step rotations of the carriage, a mold having a mold cavity extending vertically therethrough and shaped to mold a stem, means for positioning the mold beneath a bowl carried by a blow pipe at said station, a press plunger spaced below the mold, a transfer cup, means for reciprocating said cup to and from a position between the plunger and mold cavity, means for moving the plunger upwardly and thereby transferring a charge of glass from the cup into the mold cavity, molding a stem and welding the stem to the bowl, automatic means for inverting the cup when it is withdrawn from between the mold and plunger, and means for forcibly ejecting from the inverted cup any residual glass remaining therein.

5. A mold comprising separable sections having vertical meeting faces with a mold cavity formed in said faces and extending vertically thru the mold and shaped to mold a stem, means for opening and closing the mold, a pressure plate beneath the mold, a vertically movable press plunger beneath and spaced below said pressure plate, the latter having an opening in alignment with the mold cavity, means for positioning an open bottomed cup between the plunger and said plate with a charge of glass therein, means for seating a bowl on the mold, and means for moving the plunger upward against the glass in the cup and forcing the glass thru said opening into the mold and thereby molding a stem and attaching it to the bowl seated on the mold.

6. The combination of a mold comprising partible sections mounted to swing about a vertical axis for opening and closing the mold, said sections having vertical meeting faces formed with a mold cavity extending vertically thru the mold, means for opening and closing the mold, a pressure plate positioned beneath the mold and having an opening therethrough to register with the mold cavity, a press plunger positioned beneath said plate and spaced therebelow, a transfer cup open at top and bottom, means for reciprocating said cup from a glass receiving position at one side of the mold to a position between said plate and plunger, and means for actuating the plunger and thereby forcing the glass thru the opening in said plate into the mold cavity.

7. The combination of a mold having a vertically disposed mold cavity opening downward thru the bottom of the mold, a press plunger positioned below the mold and in register with the mold cavity, means for reciprocating the plunger toward and from the mold, an open bottomed cup for receiving a charge of molten glass, means for moving the cup with its charge into a position between the plunger and the mold, the plunger being movable upward within the cup for forcing glass into the mold cavity, means for separating the mold and cup by a relative vertical movement, a knife, and means to shear the knife across the bottom of the mold and thereby sever the string of glass extending from the mold to the cup when the mold and cup are separated.

8. The combination of a mold having a vertically disposed mold cavity opening downward thru the bottom of the mold, a press plunger positioned below the mold and in register with the mold cavity, means for reciprocating the plunger toward and from the mold, an open bottomed cup for receiving a charge of molten glass, means for moving the cup with its charge into a position between the plunger and the mold, the plunger being movable upward within the cup for forcing glass into the mold cavity, a pressure plate interposed between the cup and the mold and formed with an opening thru which the molten glass is forced from the cup into the mold, means for lifting the mold away from the said plate, a cutter, and means for shearing the cutter across the bottom of the mold for severing the tail glass extending from the mold to said plate.

9. The combination of a mold, a supporting plate on which the mold is mounted, a press plunger beneath the mold, a cup for receiving a charge of glass, means for positioning the cup with its charge between the plunger and the mold, means for actuating the plunger and thereby forcing a charge of glass from the cup upwardly into the mold cavity, means for thereafter lifting said supporting plate and mold, and means for severing the tail of glass depending from the mold, said severing means including a knife, a bell crank operatively connected to the knife and mounted to move up and down with said supporting plate, a piston motor, a valve controlling said motor, means for automatically actuating the valve as the mold and support approach the limit of said upward movement, and means providing operating connections between the motor and said bell crank and cutter.

10. A machine for fabricating glass articles comprising a carriage, a piston motor for lifting the carriage including a vertically reciprocating piston and piston rod, means for attaching the carriage to said rod, means for intermittently rotating the carriage about the axis of said rod, said carriage comprising a series of units each including means for releasably holding a blow pipe with a blown glass bowl thereon, said units with the blow pipes and bowls thereon being brought in succession to a molding station by the rotation of the carriage, a press mold at said station, said mold having a vertically disposed stem-shaped mold cavity extending therethrough for molding a stem, means for positioning the mold beneath a bowl at the said station with the mold cavity open to and directly beneath the bowl, a press plunger spaced below the mold and in line with the mold cavity, means for positioning a charge of glass between the mold and plunger, means for moving the plunger vertically toward the mold cavity and thereby forcing a portion of the glass into the mold cavity, molding a stem and attaching it to said bowl, a cutter, and means for projecting it between the mold and plunger and severing the glass at the bottom of the mold.

11. A machine for fabricating glass articles comprising in combination, a carriage, automatic means for intermittently rotating the carriage step by step about a vertical axis, automatic means for lifting the carriage vertically before each said step rotation and for lowering the carriage at the completion of each step rotation, an annular series of blow pipe holders on the carriage each including vertically spaced snaps for holding a blow pipe vertical with a blown glass bowl on the lower end thereof, said holders with the blow pipes and bowls thereon being brought in succession to a molding station by said step rotations of the carriage, a press mold having a stationary mounting at said station independent of the said carriage, said mold having a mold cavity open to and in register with a bowl at said station, and means cooperating with the press mold for applying pressure to glass within the mold and thereby molding a stem therein and attaching the stem to a bowl while the latter is held by a blow pipe at said station.

12. A machine for fabricating glass articles comprising in combination, a carriage, automatic means for intermittently rotating the carriage step by step about a stationary vertical axis, automatic means for lifting and lowering the carriage, means for synchronizing the lifting and lowering movements of the carriage with said step rotations and causing the carriage to be lifted before each said step rotation and lowered at the completion of each step rotation, blow pipe holders on the carriage brought in succession to a molding station by said step rotations of the carriage, each said holder comprising spaced snaps in vertical alignment for holding a blowpipe vertical, a press mold having a stationary mounting at said station separate from the carriage, means cooperating with the press mold for molding a stem therein and attaching the stem to a bowl while the carriage is at rest and while said bowl is attached to a blow pipe on a holder at said station, and a reheating chamber at a station beyond said molding station and positioned and arranged to receive and reheat the end of the molded stem.

13. The combination of a mold, means for supporting it in a charge receiving position, means for opening and closing the mold, a transfer cup for receiving charges of molten glass, a carrier to which said cup is attached, with the cup in an upright position, automatic means operable to move the carrier and cup while the cup is held upright to and from a discharging position in which the cup is adjacent to the mold, automatic means for transferring a charge of glass from the cup to the mold while the cup is in said discharging position and thereby filling the mold cavity, automatic means for swinging the cup about a horizontal axis after it has been withdrawn from said discharging position and thereby inverting the cup for discharging therefrom any residual glass remaining therein, and automatic means for synchronizing the movements of the mold and cup.

14. Apparatus for fabricating glass articles comprising a carriage, means for rotating the carriage about a vertical axis, said carriage comprising upper and lower spiders and vertical tie rods connecting said spiders, said tie rods being rigidly connecting at their upper and lower ends to the spiders, blow pipe holding mechanisms associated with said tie rods and each including a sleeve mounted for up and down movement on a tie rod and upper and lower pairs of snaps for holding a blow pipe, said snaps being vertically spaced apart and mounted on said sleeve for up and down movement therewith, and means for yieldingly holding the sleeve and snaps in their lowered position.

15. Apparatus for fabricating glass articles comprising a carriage, means for rotating the carriage about a vertical axis, said carriage comprising upper and lower spiders and vertical tie rods connecting said spiders, said tie rods being rigidly connected at their upper and lower ends to the spiders, blow pipe holding mechanisms associated with said tie rods and each including a sleeve mounted for up and down movement on a tie rod and upper and lower pairs of snaps for holding a blow pipe, said snaps being mounted on said sleeve for up and down movement therewith, a neck holding plate connected to said sleeve adjacent the lower end thereof and including means to hold the neck portion of a blown bowl on the blow pipe while the pipe with the bowl thereon is held by said snaps, and spring means for yieldingly holding the said sleeve in its lowered position.

16. Glass fabricating apparatus comprising in combination, a carriage mounted for rotation about a vertical axis, means for intermittently rotating the carriage step by step, means operable automatically to lift the carriage prior to each step rotation and lower the carriage after the completion of each step rotation, holding devices on the carriage for holding blow pipes in a vertical position with blown glass bulbs thereon, each said pipe with the bulb thereon being brought to a plurality of stations in succession by the said movements of the carriage, means at one said station for straightening the bulbs including a stationary support, a cup mounted on said support for rotation about a fixed axis, and means for rotating the cup, a mold mounted separately from the carriage at a succeeding station and positioned to have the straightened bulb set thereon while supported on the carriage, and automatic means for press molding a stem in the mold and attaching it to said bulb while the latter is held in said position on the mold.

17. The combination of a press mold, a support for the mold, a press plunger beneath and spaced below the mold, said plunger being mounted for up-and-down movement, a horizontal slideway, a carrier movable toward and from the mold on said slideway, a transfer cup having a swivel connection with the said carrier for rotation about a horizontal axis for inverting and reinverting the cup, said cup being open at top and bottom, a cam, means for rotating the cam, means operated by the cam for moving the carrier and cup forwardly from a retracted position to an intermediate position at which the cup receives a charge of glass and then forwardly to a discharging position and thereafter withdrawing the carrier and mold to said retracted position, said cup when in said discharging position being aligned between the press plunger and mold, means for moving the plunger upward into the cup while the cup is in said aligned position and thereby forcing glass therefrom into the mold cavity, means operable automatically during said withdrawing movement of the carrier to rotate the cup about its horizontal axis and thereby invert the cup, and means for reinverting the cup during its forward movement from said retracted position to the charge receiving position.

18. The combination of a press mold, a support for the mold, a press plunger beneath and spaced below the mold, said plunger being mounted for up-and-down movement, a horizontal slideway, a carrier movable toward and from the mold on said slideway, a transfer cup having a swivel connection with the said carrier for rotation about a horizontal axis for inverting and reinverting the cup, said cup being open at top and bottom, a cam, means for rotating the cam, means operated by the cam for moving the carrier and cup forwardly from a retracted position to an intermediate position at which the cup receives a charge of glass and then forwardly to a discharging position and thereafter withdrawing the carrier and mold to said retracted position, said cup when in said discharging position being aligned between the press plunger and mold, means for moving the plunger upward into the cup while the cup is in said aligned position and thereby forcing glass therefrom into the mold cavity, means operable automatically during said withdrawing movement of the carrier to rotate the cup about its horizontal axis and thereby invert the cup, means for reinverting the cup during its forward movement from said retracted position to the charge receiving position, an ejector device comprising a piston motor including a plunger reciprocable vertically, said plunger being positioned over the transfer cup while the latter is in its inverted position, and means for actuating said motor and projecting said plunger downward into the inverted cup and thereby forcibly discharging therefrom any residual glass remaining in the cup.

19. A machine for fabricating glass articles comprising in combination, a carriage, means for supporting a work-piece thereon, means for rotating the carriage and thereby bringing the work-piece to a press molding station, a press mold at said station having a mold cavity with openings through the mold walls, one said opening being adjacent to the work-piece when the latter is at said station, means for introducing a charge of molten glass into the mold through the other said opening and molding the glass in the mold cavity, said last mentioned means comprising a press plunger and means for actuating said plunger and thereby forming a stem in said press mold and concomitantly forcing glass from the mold cavity into welding contact with the work-piece and thereby attaching said stem to the work-piece at said station, a cutter, and means for projecting it between the plunger and mold and shearing it across the mold at said charge receiving opening.

20. A machine for fabricating glass articles comprising a carriage, means for rotating the carriage and lifting and lowering it intermittently, means on the carriage for holding a blow pipe with a blown bowl thereon, said blow pipe being brought to a press molding station by the rotation of the carriage, a press mold at said station having a vertically-disposed stem-shaped mold cavity for molding a stem, the ends of said cavity being open at the top and bottom of the mold, means for centering the mold directly beneath the said bowl at said station with the mold cavity open to the bottom surface of the bowl, a press plunger beneath and in register with the mold cavity when the mold is in said centered position, means for positioning a charge of molten glass between the plunger and the mold cavity, means for moving the plunger upward and thereby forcing glass into the mold and press molding and forming a stem within the mold cavity and simultaneously welding the stem to said bowl, a cutter, and means for projecting it between the plunger and the mold and shearing it across the bottom of the mold.

21. The combination of a mold, means for holding the mold in a charge receiving position, a transfer cup separate from the mold, a carrier for the cup slidably mounted for movement toward and from a discharging position in which the cup is adjacent to the mold, means for transferring molten glass from the cup to the mold while the cup is in said discharging position, means for severing residual glass in the cup from the glass in the mold, and automatic means for rotating the cup about a horizontal axis and thereby inverting it when withdrawn from the mold.

22. A glass fabricating machine comprising in combination, a carriage, means thereon for supporting a blow pipe in upright position with a blown bulb of glass attached to and depending from the lower end of the blow pipe, a straightening device including a cup to receive the bulb, a stationary support separate from the carriage, a shaft mounted in said support for rotation about a vertical axis, means connecting the cup to said shaft for rotation therewith, means for rotating the shaft about its axis, means for rotating the carriage about a vertical axis and thereby positioning said bowl over said cup and then lowering the carriage and thereby positioning the bowl in the cup, and means for holding the carriage stationary while the bowl is in the cup and thereby causing the bulb to be straightened.

JOHN P. SCHELLHAUS, Jr.